(12) United States Patent  (10) Patent No.: US 7,745,946 B2
Ambrose  (45) Date of Patent: Jun. 29, 2010

(54) MULTIFUNCTION INTEGRATED PORTABLE POWER AND UTILITY APPARATUS

(75) Inventor: Donald I. Ambrose, Nevis, MN (US)

(73) Assignee: Gary Carter, Sr., Schaumburg, IL (US)

( * ) Notice: Subject to any disclaimer, the term of this patent is extended or adjusted under 35 U.S.C. 154(b) by 0 days.

(21) Appl. No.: 11/800,154

(22) Filed: May 3, 2007

(65) Prior Publication Data

US 2007/0267870 A1  Nov. 22, 2007

Related U.S. Application Data

(63) Continuation-in-part of application No. 10/755,558, filed on Jan. 10, 2004, now abandoned.

(51) Int. Cl.
 *H02K 7/18* (2006.01)
 *F02B 63/00* (2006.01)
 *H05B 7/11* (2006.01)

(52) U.S. Cl. .................... 290/1 A; 219/133; 123/2

(58) Field of Classification Search ............. 290/1 A, 290/51, 54, 1 R; 60/618; 219/133; 123/2; 310/92, 114, 112
See application file for complete search history.

(56) References Cited

U.S. PATENT DOCUMENTS

| | | | | |
|---|---|---|---|---|
| 3,214,084 A | * | 10/1965 | Smirl | 417/44.9 |
| 3,426,875 A | * | 2/1969 | Sturmer | 192/84.21 |
| 3,678,284 A | * | 7/1972 | Peters | 290/1 R |
| 4,425,520 A | * | 1/1984 | Hiraga | 192/84.961 |
| 4,965,998 A | * | 10/1990 | Estigoy et al. | 60/325 |
| 5,252,874 A | * | 10/1993 | Viegas | 192/84.81 |
| 5,664,656 A | * | 9/1997 | Dissett | 192/105 CD |
| 6,099,265 A | * | 8/2000 | Rowe et al. | 417/313 |
| 6,230,866 B1 | * | 5/2001 | Link | 192/84.1 |
| 6,476,513 B1 | * | 11/2002 | Gueorguiev | 290/55 |
| 6,784,560 B2 | * | 8/2004 | Sugimoto et al. | 290/1 R |
| 2001/0000607 A1 | * | 5/2001 | Trinkner et al. | 219/133 |
| 2004/0182846 A1 | * | 9/2004 | Silvestro | 219/133 |

* cited by examiner

*Primary Examiner*—Julio Gonzalez
(74) *Attorney, Agent, or Firm*—Michael A. Essien; Fondungallah Kigham Essien, LLC

(57) ABSTRACT

An integrated multi-function, portable power and utility apparatus having a single prime mover device having a single engine device having at least two opposite extending rotary output devices wherein the engine device turns one output device clockwise and the other counterclockwise without belts, pulleys, chains or gears. An electric generator device is directly connected to one of the two rotary output devices and has a plurality of electric output devices. A fluid pumping device is directly connected to the other rotary output device. The fluid pumping device is preferably a rotary screw-type air compressor.

10 Claims, 7 Drawing Sheets

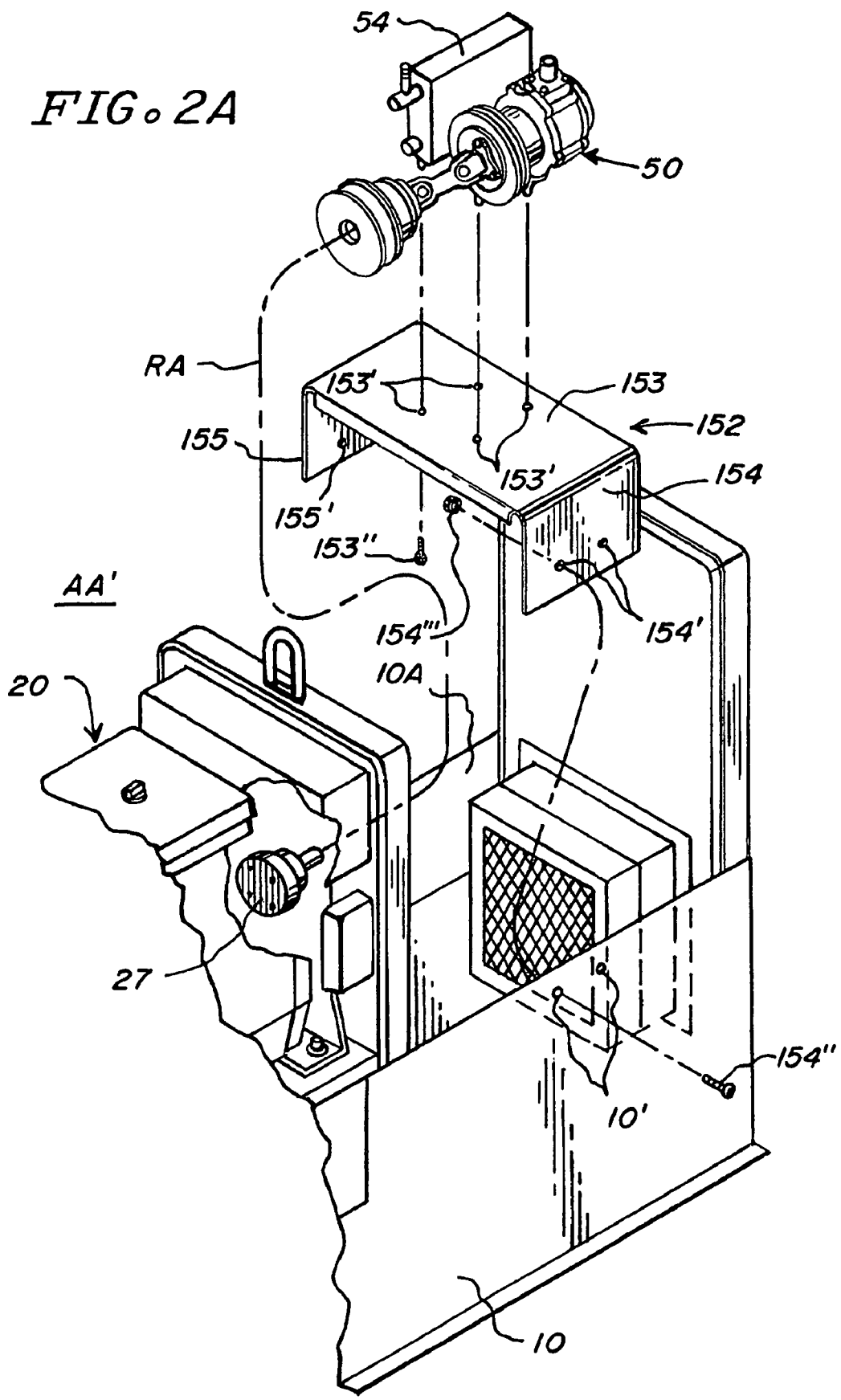

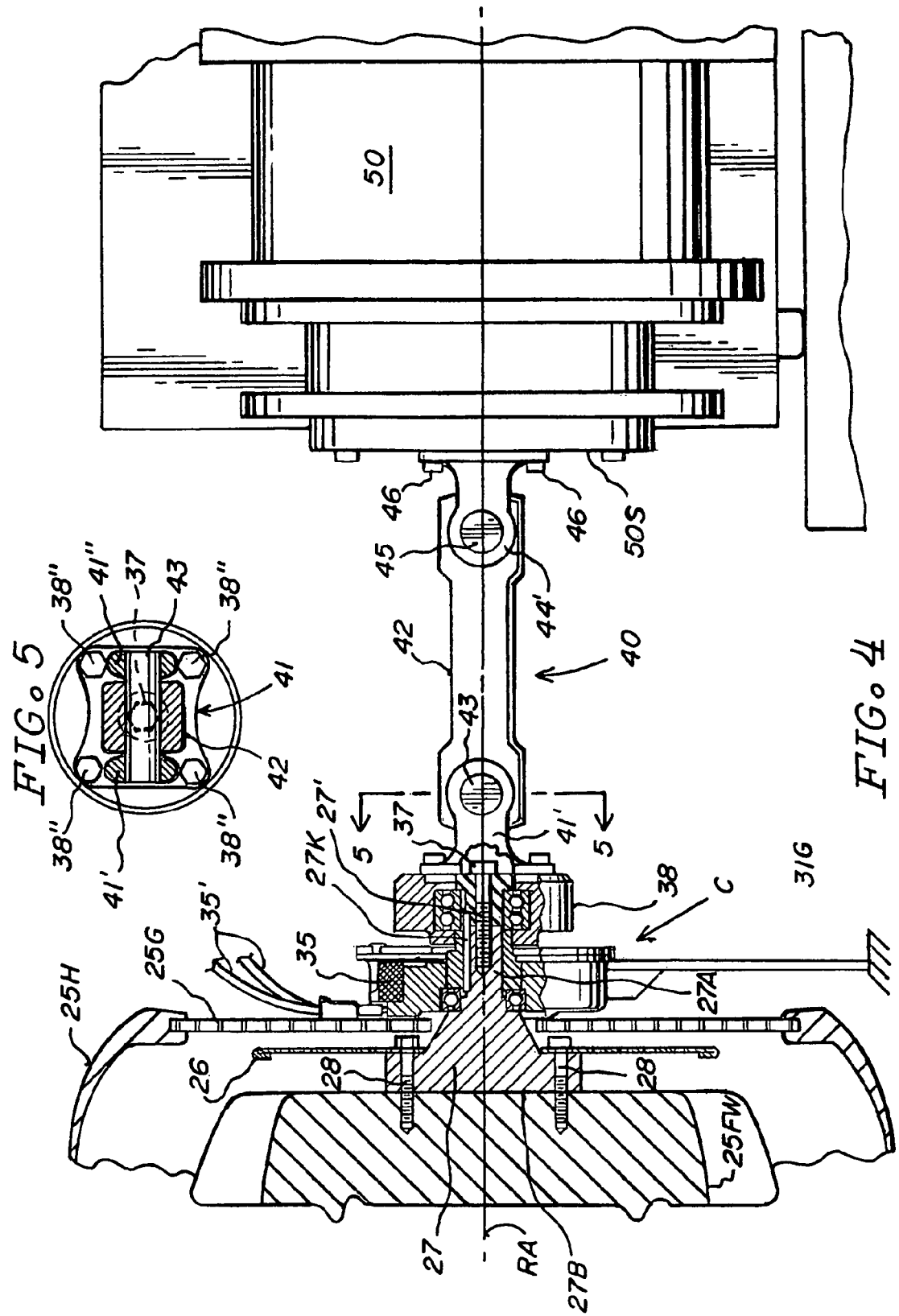

MULTIFUNCTION INTEGRATED PORTABLE POWER AND UTILITY APPARATUS

CROSS REFERENCE TO RELATED APPLICATIONS

This application is a continuation-in-part of application Ser. No. 10/755,558, filed Jan. 10, 2004, now abandoned which is incorporated herein by reference.

BACKGROUND OF THE INVENTION

There are numerous single-purpose means for providing power. For example, there are prior art engine driven electrical generators. The engines may be gasoline, diesel, or fluid (liquid or gaseous). The generators may be A.C. or D.C. The units may be stationary or portable. An example of a portable gas engine driven electrical generator is a model 225G welder-generator marketed by Miller Electric Manufacturing Co. of Appleton, Wis.

Another single-purpose means for providing power, i.e., fluid power, are numerous prior art electric motor or internal combustion engine driven air (or other gas) compressors and hydraulic pumps, the term "fluid" being generic to both gaseous and liquid mediums.

However, there is no prior art anticipation for the efficiently integrated multi-purpose, multi-function portable power and utility apparatus provided by this invention.

SUMMARY OF THE INVENTION

The present invention provides a compact, integrated, multi-function power and utility center or apparatus characterized by having only one prime mover power unit. In a basic embodiment, the invention provides a portable, integrated apparatus comprising only one engine, i.e., a single prime mover means having a drive shaft means connected to drive both an electric generator and an air compressor. The engine or prime mover means may be gas, diesel or LP; hydraulic; air; electric; or power-take-off (PTO) from a separate vehicle, e.g., a tractor.

An important aspect of the present invention is the operation of the drive shaft means. This drive shaft preferably turns in a clockwise direction and the direct drive means to the air compressor turns in a counterclockwise direction to obviate the need for belts, pulleys, chains or gears. Thus the compressor used in the present invention is driven by counterclockwise rotation.

Importantly the invention provides a direct drive from the prime mover or engine means to both the aforesaid electric generator and air compressor. The direct drive importantly obviates the need for belts, pulleys, chains or gears which are problematic and adversely affect the life expectancy, and increase the maintenance costs for the power and utility apparatus.

Also important is the use of a rotary screw-type air compressor directly connected to the prime mover. The advantages of this have the ability to deliver the desired volume of compressed air, at rated speed, without reliance on storage tanks, and further to have minimal start-up loading on the prime mover.

Thus the present invention provides an integrated multi-function power and utility apparatus comprising a single prime mover, such as a gasoline-type internal combustion engine, which provides the power for a plurality of functions. The engine has at least two rotary output means, e.g., a drive shaft means which may be connected to provide rotative power or torque to at least two different load devices.

Electric generator means and fluid pumping means are respectively and directly connected to the at least two rotary output shaft means, i.e., the term "directly" excludes problematic belts, pulleys, chains or gears and thus minimizes down time and maintenance while maximizing life span of the apparatus.

The electric generator means may supply a plurality of loads such as electric welding including arc welding, and electric power for lighting and tools.

The fluid pumping means in the preferred embodiment is selectively directly coupled to the prime mover via a controllable clutch means. The fluid pumping means may be of the hydraulic (e.g. various weight oils) type or gaseous (e.g., air) compressor type. In the preferred embodiment of the invention a rotary screw-type air compressor is directly coupled to the prime mover; the compressed air output of the compressor is available for a plurality of industrial uses such as air-powered tools.

DESCRIPTION OF THE DRAWING

FIG. 2A is a view of a modified apparatus AA' showing the preferred embodiment of a support means for the air compressor; this figure is similar to the right side of FIG. 2 but is somewhat enlarged;

FIG. 4 is an enlarged view of a portion of FIG. 3 of the direct coupling between the prime mover/engine and the air compressor;

FIG. 5 is a view taken along section lines 5-5 of FIG. 4;

DETAILED DESCRIPTION OF THE INVENTION

Figure 1:
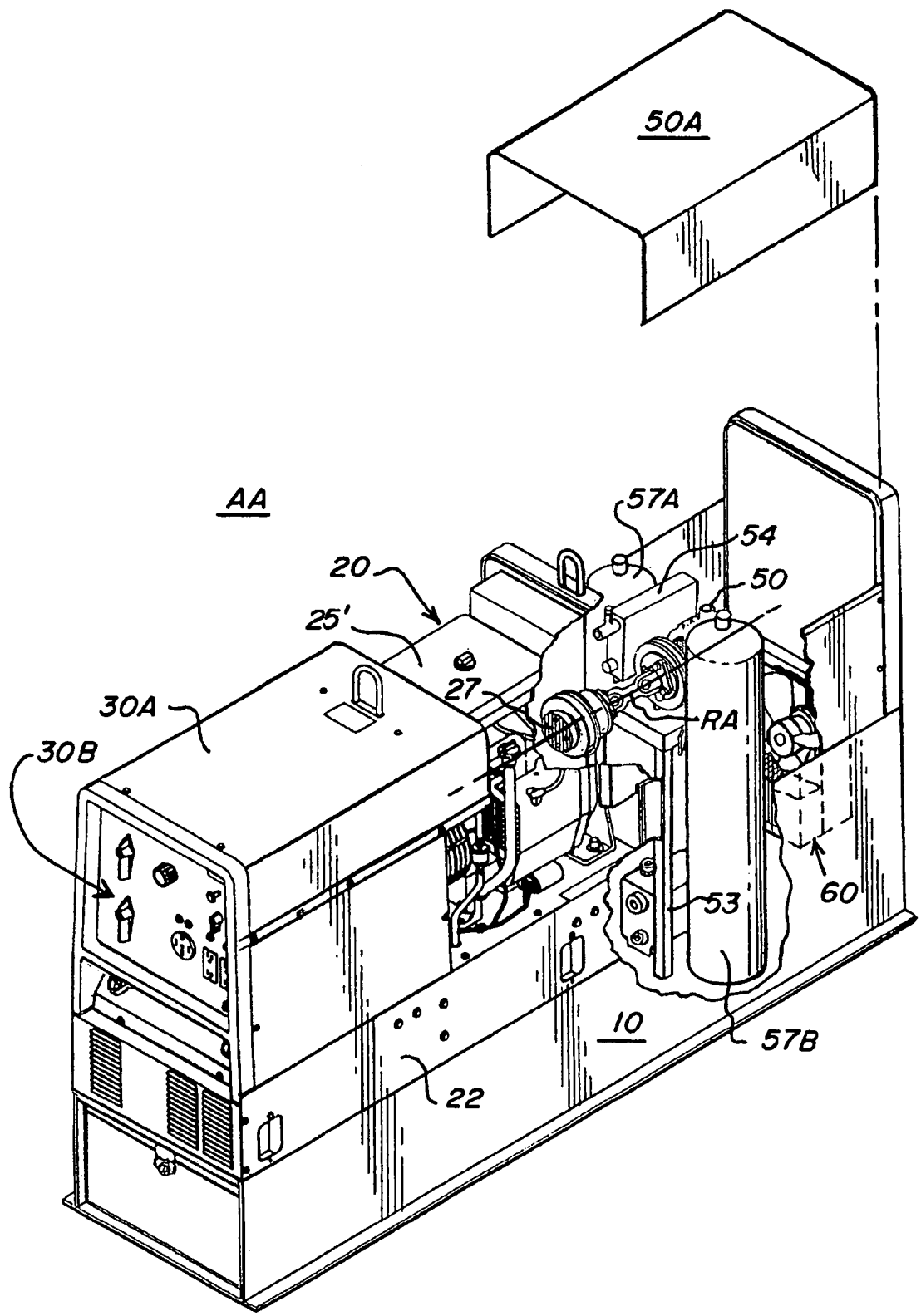
FIG. 1 is an isometric depiction, partially cut-away, of an integrated, multi-function power and utility apparatus embodying my invention, the cut-away showing the gasoline engine-type prime mover 25.
Figure 2:
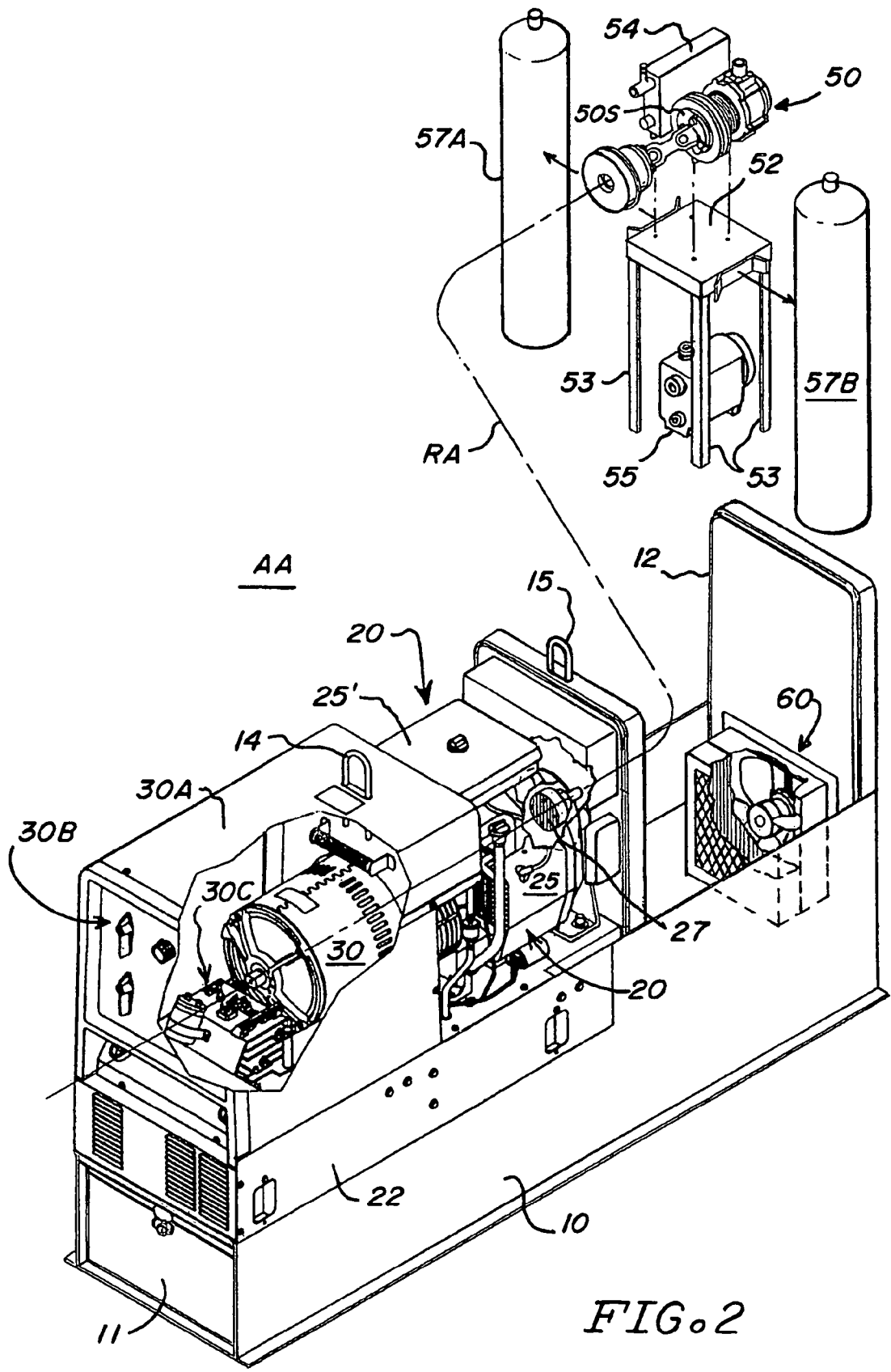
FIG. 2 is a view similar to that of FIG. 1 but (1) with a cut-away of the housing to show an electrical generation means 30, and (2) with the air compressor and associated apparatus separated/exploded away from the remaining apparatus.
Figure 7:
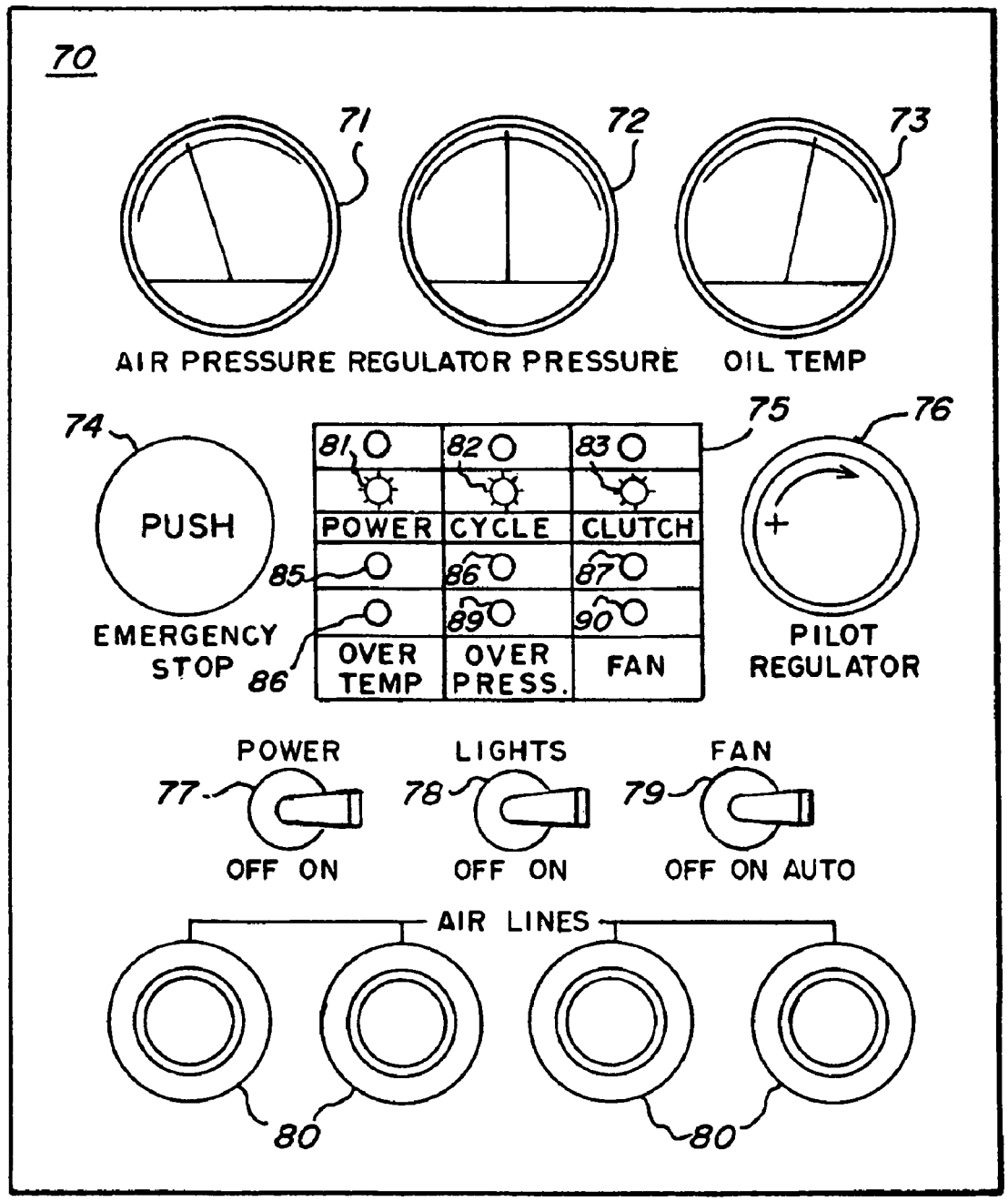
FIG. 7 is a view taken along section lines 7-7 of FIG. 3 showing the instrument and control board for the air compressor function of the multi-function power and utility apparatus.

Referring to FIGS. 1 and 2, the designator AA covers all of the apparatus disclosed therein, i.e., an integrated, multi-function power and utility apparatus comprising a base means 10 (having opposite ends 11 and 12) which may be stationary or may be portable by being mounted on a trailer or on skids or the like. A sub-base 22 is mounted on base 10 and provides support for a gasoline-type engine or prime mover 25 connected directly to an electrical generator 30, these units collectively being designated by reference 20. The prime mover 25 and generator 30 have a common rotational axis RA. Apparatus similar to that shown mounted on sub-base 22 is commercially available, e.g., the Bobcat.™.225G AC/DC, constant current/constant voltage gasoline engine driven welding generator manufactured and sold by Miller Electric Manufacturing Co. Engine-generator unit 20 further includes a housing cover 30A, a control panel and electrical outlet means 30B, and control means including fuse means 30C. One end 11 of the base means 10 may be opened to access storage space within the base means. The opposite end 12 includes an instrument and control board shown in FIG. 7 and discussed in more detail below. A pair of lifting means 14 and 15 are provided for the positioning of the sub-base 22 onto base 10. The engine 25 includes an accessory air cleaner or filter 25'.

The integrated, multi-function power and utility apparatus AA shown in FIGS. 1 and 2 further includes an air compressor means 50 directly coupled to the prime mover or engine 25 by a coupling means 40 shown in greater detail in FIGS. 3-6 and discussed in detail below. Thus a single prime mover (engine 25) directly supplies the rotational torque (about rotational axis RA) to both the generator 30, as aforesaid, and also to the air compressor 50; this facilitates substantial savings in capital investments, space requirements, and efficiencies without the need for belts, pulleys, gears or chains. A housing cover member 50A is shown in FIG. 1 detached from its normal position of covering the compressor zone of the apparatus.

Figure 3:
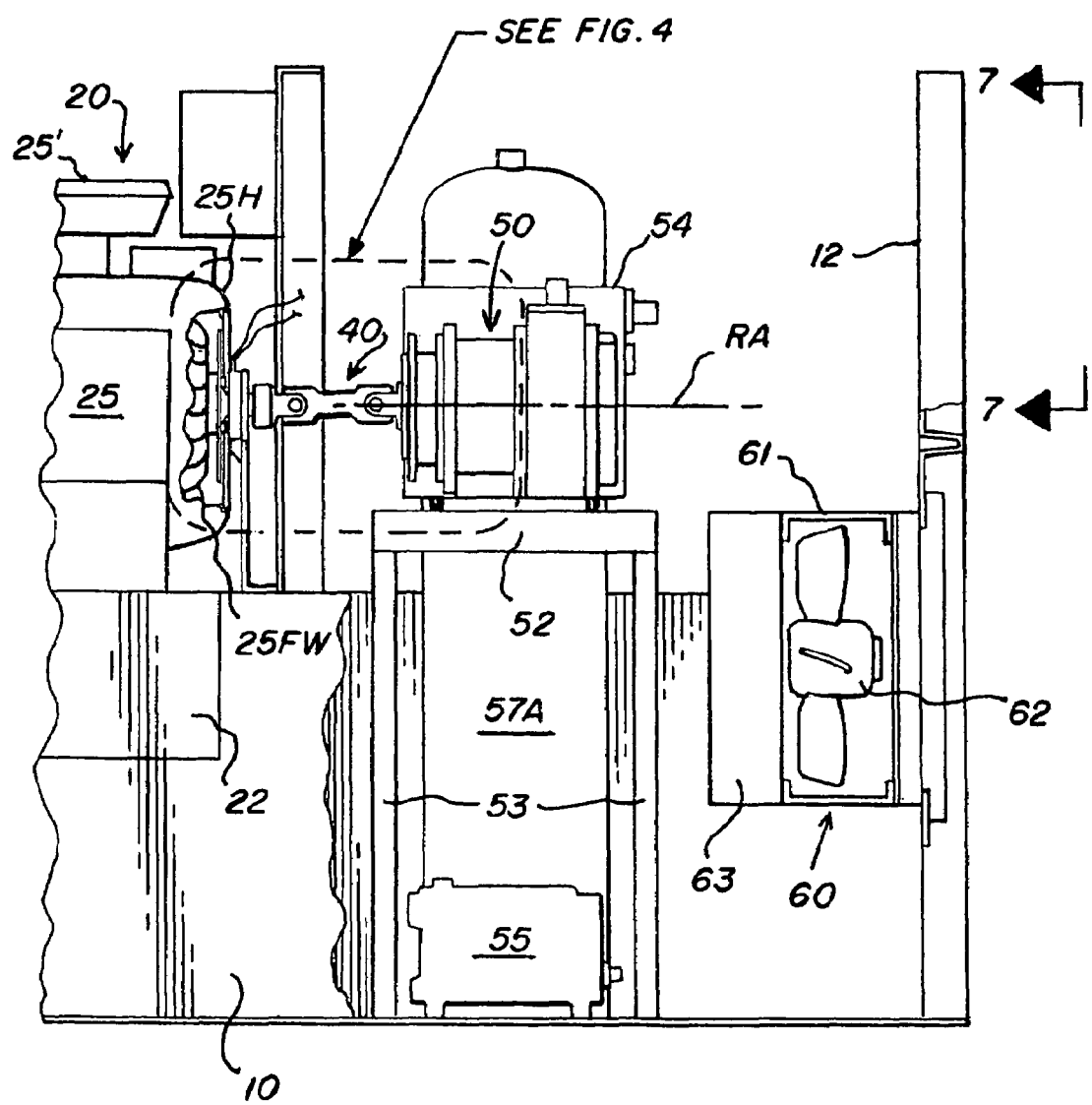
FIG. 3 is a side view of a portion of the apparatus of FIG. 1 showing, in particular, the direct coupling of the generator 25 to air compressor 50.

FIG. 3 shows one end of the engine 25 (opposite from the end coupled to the generator 30), a portion of the engine flywheel 25FW, an engine housing 25H, and an end air ventilation grill 25G. A coupling means 40 is connected between the engine flywheel 25FW and the air compressor 50 providing driven means for the compressor 50 in a counterclockwise direction. The air compressor 50 is shown (see also FIGS. 1 and 2) mounted on a suitable support or sub-base 52 having legs 53 resting on the bottom of base means 10. Optional accessory equipment for the air compressor 50 includes an air/oil separator 54 and an air moisture extractor 55. Additional optional accessory apparatus for the air compressor are compressed air storage tanks 57A and 57B. Each piece of driven equipment is designed to turn in a clockwise direction as measured from the face of the unit being driven. The compressor shaft turns in a counterclockwise direction when measured from the front of the compressor, thus providing high load at rated conditions.

The preferred embodiment AA' of the invention is shown in FIG. 2A. The air compressor 50 and the air/oil separator 54 are mounted on a horizontally oriented support base or shelf 152 comprising a main support section 153 having at its ends a pair of downwardly extending end sections 154 and 155. The end sections 154 and 155 are respectively connected to sides 10 and 10A of the base means using attachment means 154"/154'" which pass through holes 10' and 154'/155'. The compressor 50 and air/oil separator are connected to the main support section 153 using attachment means 153" passing through holes 153'. The vertical and lateral positioning of the compressor is selected so that the rotational axis of the drive to the compressor is aligned with the primary axis RA; however if there is any misalignment, the coupling means 40 described below will accommodate same. It should also be noted that the embodiment of FIG. 2A does not show the optional air tanks shown in FIGS. 1 and 2; they are not required when the aforementioned rotary screw-type compressor is provided. The space vacated by the air tanks may be advantageously used for other utility apparatus such as oxygen tanks, acetylene tanks, argon tanks, and fire extinguishers—all related to welding operations.

The coupling means 40 is shown, on an enlarged scale, in FIGS. 4 and 5. A cone-shaped power take-off member 27 has (1) a flat base portion 27B adapted to be abutted against the flywheel 25FW and secured thereto by a plurality of bolt means 28, and (2) a cylindrically shaped axially extending stub 27A co-axial with the rotational axis RA. Stub 27A has at the outboard end thereof an inwardly extending threaded bore 27' (for receiving the threaded shank of a connector bolt means 37). The outer diameter of the stub 27A is sized for a close fit with the inner diameter 29' of a sleeve 29 of the clutch assembly C shown also in FIG. 6. Sleeve 29 is journaled for rotation about axis RA by being positioned in the inner races of ball bearing means 32 and 34. An annular collar member 36 has an outer diameter sized also for a close fit with the inner diameter 29' of sleeve 29 and further has (1) a radially extending flange portion 36A at the outboard end thereof for abutment with the inner race of bearing means 34, (2) an axially extending bore 36B sized for passage therethrough of the connector bolt means 37, and (3) an inboard axial end surface 36C.

A radially extending clutch plate 33 is integrally connected to the outer periphery 29A of sleeve 29. At the outer radial extent of clutch plate 33 is an axially extending lip portion 33A thus giving plate 33 a shape of a shallow cup.

Clutch C further includes a magnetic core having a central annular shaped portion 31, the inner diameter of same being sized to closely fit the outer race of bearing 32 but to be non-contacting with the sleeve 29. The magnetic core further includes a radial extension of portion 31 and an axial extension 31 A which, as shown best in FIG. 6, overlaps, but is in non-contacting relationship with, portion 33A of clutch plate 33. Electric coil means 35 are positioned in the annular space defined between the outer periphery of the annular portion 31 and the inner periphery of the portion 33A of the clutch plate 33. Electric lead means 35' are adapted to be selectively energized when it is desired to transmit torque from the prime mover to the air compressor, as will be discussed in more detail below.

Thus the magnetic core 31 and 31 A and the coil means 35 form a stator member of an electromagnetic clutch and are held stationary with respect to base 10 by a bracket or equivalent means 31G.

As shown in FIG. 4, the sleeve 29 receives the axial end 27A of stub 27, and connector bolt means 37 passes through the bore 36B of annular collar 36 and is tightened into the threaded bore 27' of stub 27 to provide a clamping action between the flange portion 36 A and the outboard axial end of the inner race of bearing 34, the inboard axial end of which is abutted against a shoulder of the sleeve 29. A key 27K in key slot means in sleeve 29 and collar 36 assures torque transmittal from the power take-off 27 to the sleeve 29 and the clutch plate 33 attached thereto.

Clutch means C further includes a driven member 38 having an annular shape, the inner diameter of which is sized to closely fit the outer race of bearing means 34 and the outer diameter of which is sized to accommodate the attachment thereto of bracket means shown best in FIG. 5. An integral flange portion 38A of member 38 extends radially inwardly at the inboard end thereof. A driven clutch plate 39 is connected by rivet means 38' or equivalent to flange 38A and comprises a radially extending disc having a diameter generally the same as that of the driving clutch plate 33.

Figure 6:
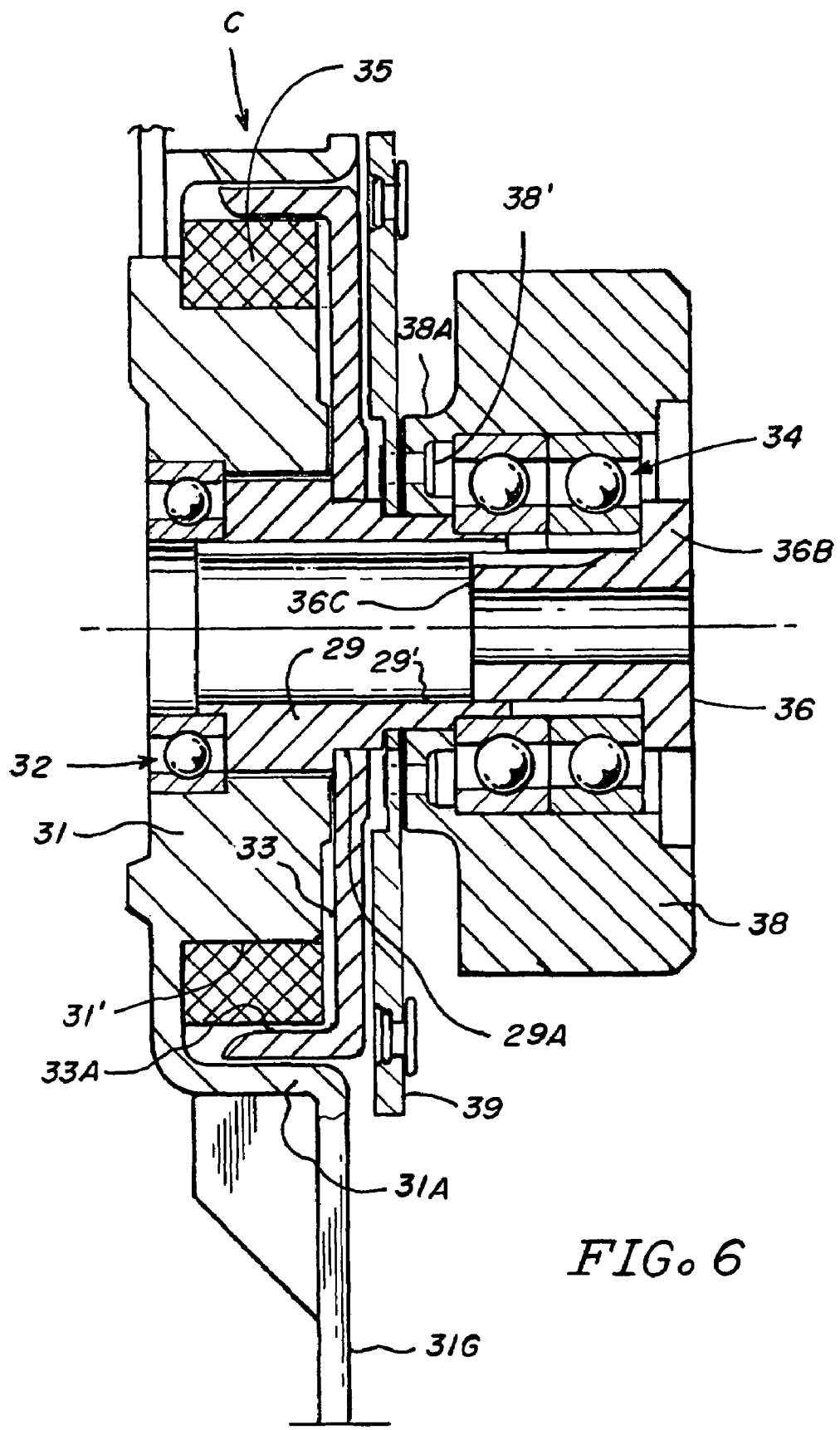
FIG. 6 is an enlarged view of the controllable clutch C in the direct coupling between the prime mover/engine and the air compressor.

Those skilled in the art will understand that the stationary core structure 31 et seq, the driving clutch plate 33, and the driven clutch plate 39 will all preferably be made of high magnetic permeability material, and that when the coil means 35 is energized, the magnetic flux generated by coil 35 will cause a coupling between the driving and driven clutch plates so that a rotating power take-off 27 will transfer torque to the driven member 38; this is illustrated in FIG. 4. In contrast clutch C as shown in FIG. 6 is depicted with the coil 35 not energized and hence the driving plate 33 is not in engagement with the driven clutch plate 39, the spacing between plates 33 and 39 being clearly shown.

The driven member 38 is directly coupled to the air compressor 50. The preferred embodiment of the invention uses the coupling means 40 depicted in FIGS. 3 and 4, i.e., a pair of universal joints connected together; this arrangement is advantageous because it facilitates a correction for any misalignment between the rotational axis of the air compressor and the axis RA of the prime mover. Thus a pair of pivot pin supporting brackets 41' and 41" are connected to member 38 by bolt means 38" and rotatably support the ends of a pivot pin means 43, the center of which journals a first end of a connecting rod 42. The other end of rod 42 is journaled on a pivot pin 45, the ends of which are rotatably supported by a pair of brackets 44' (only one shown in the drawings) which in turn are connected to the rotatable axial end 50 S, i.e., input drive means of the air compressor 50.

The preferred embodiment of my invention utilizes for the compressor 50 a rotary screw-type air compressor, i.e., model GD INTEGRA manufactured by the Gardner Denver Corporation. While, in principle, other fluid-type pumps may be used in this invention, the rotary screw-type air compressor has been found to be superior. For example the Gardner Denver compressor has a very low start up torque requirement while capable of delivering the desired volume of compressed air at rated speed. Also, as indicated, this pump can directly handle normal loads thus eliminating the need for auxiliary air tanks.

Referring to FIG. 2, the several tubing or hoses or equivalent connections between the air compressor 50 and auxiliary components 54, 55, 57A and 57B have been omitted to obviate drawing clutter but are well understood and known by those skilled in the art. The control board 70 shown in FIG. 7 includes four separate air line connection ports or jacks 80 which are either directly connected to the output of the air compressor 50 or, optionally, connected to the air tanks 57A and 57B.

As is best shown in FIG. 3, a cooling means 60 in the form of a fan is provided for cooling of the compressor zone of the apparatus and comprises a frame 61 for housing and supporting a fan 62 adapted, when energized, to draw in outside air and deliver it via a duct 63 to the compressor zone.

The control board 70 additionally includes air pressure, regulator pressure and oil temperature indicators or gauges 71, 72 and 73; an emergency stop button 74; a display means 75; a pilot regulator 76; and power, lights and fan "on-off" toggle switches 77, 78 and 79. Gauges 71 and 72 thus provide important data relating to the air compressor and regulator in the supply of air to the air line ports 80. Gauge 73 provides data on the temperature of the oil. The display means 75 has a plurality of indicating means including a "ready/green" light 81, and "operate/yellow" light 82, and a "failure/red" light 83. The display means 70 further at 85, 86 and 87 has indicators which respectively signal data relating to power, cycle and energization of the coil 35 of clutch C, and at 88 and 89 indicia for "over temperature" and "over pressure" respectively. An indicator 90 signals the state of the energization of the fan 62 of the cooling means 60. It will also be understood that, integral with the aforementioned Miller Model 225G, means are provided for fail safe operation of the prime mover/electrical generator apparatus. Means are also provided for remote control of the unit.

The present invention can be embodied in ways other than those specifically described herein which were presented by way of non-limiting example only. Variations and modifications can be made without departing from the spirit and scope of the invention which is to be measured only by the appended claims.

The invention claimed is:

1. An apparatus, comprising:
    an integrated multi-function, portable power and utility center, comprising:
        a) a single prime mover means having a single engine means having at least two opposite extending rotary output means, said prime mover provided by a direct drive wherein said direct drive turns one output means in a clockwise direction and the other output means in a counterclockwise direction without belts, pulleys, chains or gears;
        b) electric generator means directly connected to one of the said at least two rotary means, said electric generator means having a plurality of electric output means; and
        c) fluid pumping means directly connected to another of said at least two rotary output means.

2. The apparatus of claim 1 wherein said another of said at least two rotary output means includes rotary output shaft means directly connected to single engine means and also directly connected to a driving means of a controllable clutch means, said controllable clutch means additionally having a driven means directly connected to the fluid pumping means.

3. The apparatus of claim 2 wherein said driven means of said controllable clutch means is directly connected to said fluid pumping means by means including universal joint coupling means.

4. The apparatus of claim 3 further characterized by said fluid pumping means being a rotary screw-type air compressor.

5. The apparatus of claim 4 including means for cooling said air compression means.

6. The apparatus of claim 5 wherein said plurality of electric output means includes arc welding supply means.

7. The apparatus of claim 4 wherein said fluid pumping means has a plurality of compressed air output means.

8. The apparatus of claim 2 wherein said driving means of said controllable clutch means is connected directly by power-take-off means to flywheel means of said engine means.

9. The apparatus of claim 8 wherein said clutch means includes stationery electromagnetic means selectively controllable to couple said driving and driven means.

10. The apparatus of claim 1, wherein at least one output means is powered by a counterclockwise rotation of the drive means.

* * * * *